(12) United States Patent
Reynolds, Jr. et al.

(10) Patent No.: US 7,850,211 B2
(45) Date of Patent: Dec. 14, 2010

(54) WEDGE THREAD CONNECTIONS HAVING A CLEARANCE GAP VOLUME

(75) Inventors: Harris A. Reynolds, Jr., Houston, TX (US); Andrew H. Tate, Houston, TX (US)

(73) Assignee: Hydril Company, Houston, TX (US)

( * ) Notice: Subject to any disclaimer, the term of this patent is extended or adjusted under 35 U.S.C. 154(b) by 929 days.

(21) Appl. No.: 11/626,615

(22) Filed: Jan. 24, 2007

(65) Prior Publication Data

US 2007/0176423 A1 Aug. 2, 2007

Related U.S. Application Data

(60) Provisional application No. 60/761,635, filed on Jan. 24, 2006.

(51) Int. Cl.
*F16L 25/00* (2006.01)
(52) U.S. Cl. .................................. 285/334; 285/390
(58) Field of Classification Search ................ 285/355, 285/390, 333, 334
See application file for complete search history.

(56) References Cited

U.S. PATENT DOCUMENTS

| | | |
|---|---|---|
| 3,822,902 A | 7/1974 | Maurer et al. |
| RE30,647 E | 6/1981 | Blose |
| 4,703,954 A | 11/1987 | Ortloff |
| RE34,467 E | 12/1993 | Reeves |
| 5,360,239 A | 11/1994 | Klementich |
| 5,454,605 A | 10/1995 | Mott |
| 6,050,610 A * | 4/2000 | Enderle et al. ................. 285/94 |
| 6,158,785 A * | 12/2000 | Beaulier et al. ............. 285/334 |
| 6,206,436 B1 | 3/2001 | Mallis |
| 6,322,110 B1 * | 11/2001 | Banker et al. ............... 285/334 |
| 6,412,831 B1 * | 7/2002 | Noel et al. ................... 285/334 |
| 6,578,880 B2 | 6/2003 | Watts |
| 6,722,706 B2 | 4/2004 | Church |
| 6,905,149 B2 | 6/2005 | DeLange et al. |
| 2006/0261595 A1 | 11/2006 | Verger et al. |

\* cited by examiner

*Primary Examiner*—Aaron Dunwoody
(74) *Attorney, Agent, or Firm*—Osha Liang LLP

(57) ABSTRACT

A wedge-threaded tubular connection includes a pin member and a box member, wherein each of the pin and box members include an engaged thread area, and a clearance gap volume formed between corresponding roots and crests of the pin and box members and arranged along an axial length of the engaged thread area according to a distribution profile. The clearance gap volume distribution profile is configured having a greater clearance gap volume proximate a central portion of the engaged thread area and progressively less clearance gap volume towards each of the distal ends of the engaged thread area.

5 Claims, 6 Drawing Sheets

WEDGE THREAD CONNECTIONS HAVING A CLEARANCE GAP VOLUME

BACKGROUND OF THE DISCLOSURE

1. Field of the Disclosure

The present disclosure generally relates to threaded connections having pipe dope. More particularly, the present disclosure relates to threaded connections having free volume for evacuation of pipe dope. More particularly still, the present disclosure relates to methods and apparatus to provide clearance gaps along an engaged thread area to result in a target free volume for the evacuation of pipe dope in large diameter wedge-threaded connections.

2. Background Art

Casing joints, liners, and other oilfield tubulars are frequently used to drill, complete, and produce wells. For example, casing joints may be placed in a wellbore to stabilize and protect a formation against high wellbore pressures (e.g., wellbore pressures that exceed a formation pressure) that could otherwise damage the formation. Casing joints are sections of pipe (e.g., steel or titanium), which may be coupled in an end-to-end manner by threaded connections, welded connections, or any other connection mechanisms known in the art. As such, connections are usually designed so that at least one seal is formed between an interior of the coupled casing joints and the annulus formed between exterior walls of the casing joints and the interior walls of the wellbore (i.e., the formation). The seals may be elastomeric (e.g., an o-ring seat), thread seals, metal-to-metal seals, or any other seals known to one of ordinary skill in the art.

It should be understood that certain terms are used herein as they would be conventionally understood, particularly where threaded tubular joints are connected in a vertical position along their central axes such as when making up a pipe string for lowering into a well bore. Typically, in a male-female threaded tubular connection, the male component of the connection is referred to as a "pin" member and the female component is called a "box" member. As used herein, "make-up" refers to engaging a pin member into a box member and threading the members together through torque and rotation. Further, the term "selected make-up" refers to the threading of a pin member and a box member together with a desired amount of torque or based on a relative position (axial or circumferential) of the pin member with respect to the box member. Furthermore, the term "box face" is understood to be the end of the box member facing outward from the box threads and the term "pin nose" is understood to be the end of the pin member facing outward from the threads of the connection. As such, upon make-up of a connection, the nose of the pin is stabbed or inserted into and past the face of the box.

Referring to the geometry of threads, the term "load flank" designates the side wall surface of a thread that faces away from the outer end of the respective pin or box member on which the thread is formed and supports the weight (i.e., tensile load) of the lower tubular member hanging in the well bore. Similarly, the term "stab flank" designates the side wall surface of the thread that faces toward the outer end of the respective pin or box member and supports forces compressing the joints toward each other such as the weight of the upper tubular member during the initial make-up of the joint or such as a force applied to push a lower tubular member against the bottom of a bore hole (i.e., compressive force).

One type of threaded connection commonly used to form a thread seal in oilfield tubulars is a wedge thread. In FIGS. 1A and 1B, a prior art connection 201 having a wedge thread is shown. "Wedge threads" are characterized by threads, regardless of a particular thread form, that increase in width (i.e., axial distance between load flanks 211 and 212 and stab flanks 213 and 214) in opposite directions on a pin member 203 and a box member 205. The rate at which the threads change in width along the connection is defined by a variable commonly known as a "wedge ratio." As used herein, "wedge ratio," although technically not a ratio, refers to the difference between the stab flank lead and the load flank lead, which causes the threads to vary width along the connection. Furthermore, as used herein, a thread "lead" refers to the differential distance between a component of a thread on consecutive threads. As such, the "stab lead" is the distance between stab flanks of consecutive thread pitches along the axial length of the connection. A detailed discussion of wedge ratios is provided in U.S. Pat. No. 6,206,436 issued to Mallis, and assigned to the assignee of the present invention. That patent is incorporated herein by reference in its entirety.

Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference in their entirety.

Referring Still to FIGS. 1A and 1B, on the pin member 201, a pin thread crest 239 is narrow towards the distal end of the pin member 201 while a box thread crest 243 is wide. Moving along an axis 200 (from right to left), the pin thread crest 239 widens while the box thread crest 243 narrows. As shown in FIGS. 1A and 1B, the threads are tapered, meaning that a pin thread 207 increases in diameter from beginning to end while a box thread 209 decreases in diameter in a complimentary manner. Having a thread taper may improve the ability to stab the pin member 203 into the box member 205 and distributes stress in the connection.

Generally, thread seals are difficult to achieve with non-wedge (i.e., free-running) threads. However, thread forms that are unable to form a wedge seal in a free-running configuration may create thread seals when used in a wedge thread configuration. As should be understood by one of ordinary skill, as wedge threads do not require any particular type or geometry of thread form, a variety of thread forms may be used. One example of a suitable thread form is a semi-dovetailed thread form disclosed in U.S. Pat. No. 5,360,239, issued to Klementich and incorporated herein by reference in its entirety. Another thread form includes a multi-faceted load flank or stab flank, as disclosed in U.S. Pat. No. 6,722,706, issued to Church and incorporated herein by reference in its entirety. Each of the above thread forms is considered to be a "trapped" thread form, meaning that at least a portion of the corresponding load flanks and/or corresponding stab flanks axially overlap. An open (i.e., not trapped) thread form with a generally rectangular shape is disclosed in U.S. Pat. No. 6,578,880, issued to Watts and incorporated herein by reference in its entirety. As such, the above thread forms (i.e., those of Klementich, Church, and Watts) are examples of thread forms that may be used with embodiments of the invention. Generally, open thread forms such as buttress or stub are not suitable for wedge threads, as they would impart a large radial force on the box member. However, a generally square thread form, such as that disclosed by Watts, or a trapped thread form, may be used, as they do not impart an outward radial force on the box member. As such, those having ordinary skill in the art will appreciate that the teachings contained herein are not limited to particular thread forms.

For wedge threads, a thread seal may be accomplished as a result of the contact pressure caused by interference over at least a portion of the connection 201 between the pin load flank 211 and the box load flank 212 and between the pin stab flank 213 and the box stab flank 214, which occurs when the connection 201 is made-up. Close proximity or interference between the roots 241 and 245 and crests 239 and 243 completes the thread seal when it occurs over at least a portion of where the flank interference occurs. Generally, higher pressure may be contained with increased interference between the roots and crests ("root/crest interference") on the pin member 203 and the box member 205 and by increasing flank interference.

Referring again to FIGS. 1A and 1B, in wedge threads, a thread seal may be accomplished through contact pressure caused by interference that occurs at make-up over at least a portion of connection 201 between pin load flank 211 and box load flank 212 and between pin stab flank 213 and box stab flank 214. Close proximity or interference between roots 241 and 245 and crests 239 and 243 completes the thread seal when occurring proximate to such flank interference. Generally, higher pressures may be contained either by increasing interference between the roots and crests ("root/crest interference") on pin member 203 and box member 205 or by increasing the aforementioned flank interference. The particular connection shown in FIG. 1 also includes a metal-to-metal seal that is accomplished by contact pressure between corresponding seal surfaces 204 and 206, respectively located on the pin member 203 and box member 205.

Although various wedge thread connections exist having positive-stop torque shoulders (e.g., Klementich, referenced above), wedge threads typically do not have torque shoulders, so their make-up is "indeterminate," and, as a result, the relative position of the pin member and box member may vary more during make-up for a given torque range to be applied than for connections having a positive-stop torque shoulder. For wedge threads designed to have flank interference and root/crest interference at a selected make-up, the connection is designed such that both the flank interference and root/crest interference increase as the connection is made-up (i.e., an increase in torque increases flank interference and root/crest interference). For tapered wedge threads having root/crest clearance, the clearance decreases as the connection is made-up. Regardless of the design of the wedge thread, corresponding flanks come closer to each other (i.e., clearance decreases or interference increases) during make-up. Indeterminate make-up allows for the flank interference and root/crest interference to be increased by increasing the make-up torque on the connection. Thus, a wedge thread may be able to thread-seal higher pressures of gas and/or liquid by designing the connection to have more flank interference and/or root/crest interference or by increasing the make-up torque on the connection. However, increased interference and make-up torque may increase stress on the connection during make-up, which may lead to premature failure of the connection.

Before make-up, pipe dope is typically applied to both the pin member and the box member of a threaded connection. Pipe dope provides lubrication to aid the make-up of the connection and prevents galling to allow for the connection to be broken-out at a later time. In oilfield applications, the pipe dope typically contains metallic particles, such as copper, to prevent galling between the threads of the pin member and the box member. The metallic particles also help achieve a thread seal between wedge threads, which make-up on both the load and stab flanks.

Because of the close-fitting manner in which wedge threads make-up, as compared to a shouldered non-wedge thread connection, less pipe dope is required. Typically, the pipe dope is only applied to the pin thread of a wedge thread connection. The application of the pipe dope is also typically achieved with a brush instead of a large swab, as is typical of other non-wedge thread connections. When a wedge thread connection is made-up, excess pipe dope can become trapped between the pin thread and the box thread, which can cause false torque readings (leading to improper make-up) or potentially damage the connection. Many of the problems associated with the pipe dope can be mitigated by applying less pipe dope than non-wedge thread connections and controlling the speed at which the connection is made-up to allow for the pipe dope to squeeze out.

Actually damaging a connection as a result of pipe dope is rare, but is still a concern for operators. One scenario in which damage to the connection can occur is when the pipe dope is too viscous. This can occur in cold weather environments such as North Slope Alaska or the North Sea when the wrong pipe dope is used. For cold environments, pipe dope with lower metal content and reduced kinematic viscosity is supposed to be used. Kinematic viscosity is the ratio of the viscosity of a fluid to its density. Centistoke is a common unit for kinematic viscosity. A centistoke is the viscosity in centipoise divided by the liquid density at the same temperature. If the wrong pipe dope is used and the connection is made-up quickly, as is typical of a power frame used for making-up connections, the pipe dope can become trapped between the pin thread and the box thread, causing a high pressure build-up that expands the box member.

A more common scenario that can occur when making up a wedge thread connection is pipe stand-off. Pipe stand-off refers to the situation in which a connection gives a false torque reading that indicates the connection is fully made-up based on a make-up torque, but is not fully made-up based on the relative position of the pin member and the box member. One cause for pipe stand-off in wedge thread connections is hydraulic lock resulting from inadequate evacuation of pipe dope. The pressure build-up may then bleed off during use, risking accidental back-off of the connection or hydraulic leaks. Pipe stand-off is a particular concern for larger diameter threaded connections, such as those greater than or equal to about 9 inches in diameter (about 0.228 m). Dope evacuation is more difficult for larger diameter threaded connections because of the longer helical path for the pipe dope.

Furthermore, pipe stand-off may be particularly problematic in strings used at elevated downhole service temperatures (i.e., the temperature a tubular would expected to experience in service). Particularly, in high-temperature service (e.g., temperatures greater than 250° F., a steam-flood string, or a geothermal string), even a small amount of stand-off may be deleterious. For instance, if a made-up wedge connection with even a small amount of stand-off is deployed to a high-temperature well, the dope may flow out of the wedge thread connection and reduce the integrity of the thread seal.

Formerly, numerous attempts have been made to provide conduits for the evacuation of pipe dope either within or adjacent to the threads. For example, U.S. Pat. No. 3,822,902 issued to Mauer, et al, discloses a threaded connection for tubular goods including an externally threaded pin member, an internally threaded box member, a resilient seal ring positioned between the pin and box members to provide a fluid seal therein, and a passage formed in either the pin or box members for conducting thread lubricant or other liquid away from the seal ring as the pin and box members are screwed together. However, it should be understood that the axial passage taught of Mauer clearly does not contemplate a thread seal.

Next, U.S. Pat. No. 6,050,610 issued to Enderle et al, discloses a stress reduction groove for tubular connections including a box member and a pin member. The stress reduction groove of Enderle takes the form of a continuous groove formed in the thread of one of the pin and box members. The groove of Enderle extends from either the beginning or the end of the one thread to a point between the beginning and end of the one thread, thereby reducing the pressure that develops between the sealing surfaces during rotational make-up in a thread lubricant applied to the threads.

Similarly, U.S. Pat. No. 6,905,149, issued to DeLange et al, discloses lubricant escape passages formed in the threads used to connect one tubular body to another. The passages conduct trapped thread lubricant out of a threaded area to prevent the creation of high lubricant pressure that may damage or cause improper make up of the threaded connection. The passages may be grooves in the crests of the thread teeth and/or may be corner bevels on the thread teeth. When used with a wedge or other metal-to-metal thread engaging designs, the escape passages may be interrupted at some point intermediate their helical path to provide a pressure seal at the point of interruption. Relieving trapped lubricant from a wedge thread connection permits consistent final makeup positions that ensure optimal pressure sealing.

A wide range of pipe dopes are commercially available. Pipe dope is typically a proprietary formulation of lubricants) and particulates. In general, higher particulate concentrations result in more viscous pipe dope, which helps to provide a thread seal in wedge thread connections. The base grease is also largely determinative of the final kinematic viscosity of the pipe dope. One company providing pipe dope for threaded connections is JET-LUBE®, Inc. (Houston, Tex., USA). One type of pipe dope provided by JET-LUBE®, Inc. is KOPR-KOTE®, which contains less than 10 percent by weight of copper as the particulate additive. KOPR-KOTE® is provided in an alternative formulation for arctic use, as are several other JET-LUBE® formulations. Higher temperature pipe dopes ("thermal grade") from JET-LUBE® utilize a petroleum oil with a kinematic viscosity of 414 to 506 centistokes at 40 degrees C. The "arctic grade" pipe dopes utilize a calcium base grease with a kinematic viscosity of about 20 to 24 centistokes at 40 degrees C., which is much lower than the thermal grade. Another pipe dope is JET-LUBE® NCS-30, which is specifically marketed for use with wedge thread connections. That pipe dope does not contain metallic particulates. Instead, JET-LUBE® NCS-30 uses a proprietary formulation of chemically inert fibers as the particulate additive. Also, JET-LUBE® NCS-30 uses a calcium base grease similar to the arctic grade compounds to provide reduced kinematic viscosity.

Although many of the problems with making-up a wedge thread are avoided by using a pipe dope with lower kinematic viscosity and/or reduced metal content, a disadvantage to such a pipe dope is reduced sealing ability in the wedge thread. The operating environment in the wellbore is much hotter than the surface, which allows for the pipe dope to flow more easily and not aid in maintaining the thread seal in the wedge thread. In general, the higher the kinematic viscosity of the pipe dope, the better the resulting thread seal in the wedge thread. Accordingly, it would be desirable to obtain better sealing capability for a connection with wedge threads by being able to use the better sealing forms of pipe dope regardless of the surface environment in which the connection will be made-up.

SUMMARY OF THE CLAIMED SUBJECT MATTER

In one aspect, the present disclosure relates to a method to manufacture a tubular connection including calculating an engaged thread area of one of a pin member and a box member of a proposed wedge-threaded connection, multiplying the calculated engaged thread area by a dope thickness factor to obtain a target free volume for the proposed wedge-threaded connection, and constructing a manufactured wedge-threaded connection having a total clearance gap volume substantially equal to the target free volume.

In another aspect, the present disclosure relates to a wedge-threaded tubular connection including a pin member and a box member, wherein each of the pin and box members include an engaged thread area, and a total clearance gap volume of the pin and box members, wherein the total clearance gap volume is calculated by multiplying the engaged thread area of one of the pin member and the box member by a dope thickness factor.

Other aspects and advantages of the disclosure will be apparent from the following description and the appended claims.

DETAILED DESCRIPTION

In one aspect, the present disclosure provides connections having a pipe dope. More particularly, select embodiments of the present disclosure comprise threaded connections with wedge threads having a pipe dope disposed between the threads of the connections. More particularly still, the present disclosure relates to methods and apparatus to provide clearance gaps along an engaged thread area to result in a target pipe dope free volume for large diameter wedge-threaded connections.

Figure 3:
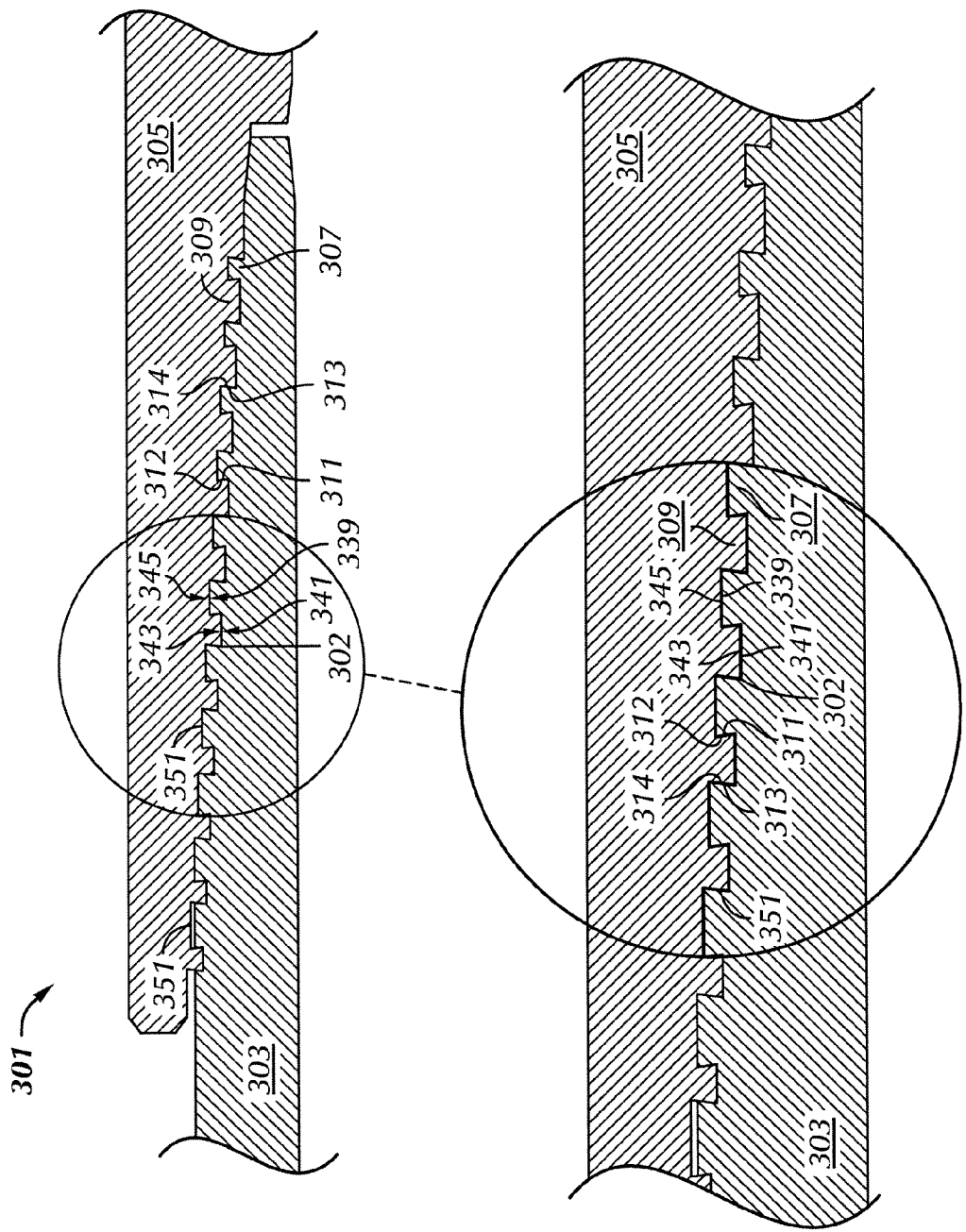
FIG. 3 shows a wedge thread in accordance with an embodiment of the present disclosure.

Referring now to FIG. 3, a threaded connection 301 in accordance with an embodiment of the present disclosure is shown. Connection 301 includes a pin member 303 and a box member 305. Pin member 303 has a tapered thread 307, which makes-up with a tapered thread 309 of box member 305. In this embodiment, in addition to being tapered, threads 307 and 309 are also wedge threads, which allow connection 301 to not have a positive stop torque shoulder in order to make-up the pin member 303 with box member 305. Furthermore, threads 307 and 309 include pin load flanks 311 and pin stab flanks 313 corresponding with box load flanks 312 and box stab flanks 314, respectively. Thread 307 on pin member 303 comprises pin crests 339 and pin roots 341 and thread 309 on box member 305 comprises box crests 343 and box roots 345. Pin crests 339 correspond with box roots 345, and pin roots 341 correspond with box crests 343.

Still referring to FIG. 3, connection 301 is characterized by an equivalence point 302. As used herein, the "equivalence point" is the point at which an adjacent root and crest of the wedge thread are substantially equal in width. Equivalence point 302 is the center of the threaded portion of the pin and box members 303 and 305 and may be used as a reference point when referring to specific features of connection 301 or specific thread pitches in threads 307 and 309. For example, threaded connection 301 has a thread diameter, which is the major diameter of pin member 303 at equivalence point 302. Because threads 307 and 309 of connection 301 are tapered, the diameter of thread 307 of the pin member 302 changes. The reference of a equivalence point 302 allows for the thread diameter of connection 301 to be easily determined. Also, threads 307 and 309 have a dovetailed thread form. As mentioned previously, other thread forms can be used for the threads without departing from the scope of the present disclosure.

Referring still to FIG. 3, a pipe dope 351 is disposed between threads 307 and 309. Specifically, pipe dope 351 is disposed in this embodiment as a layer between all of the roots, crests, and flanks of the pin member and the box member. In one embodiment, pipe dope 351 may be applied to pin member 305 using a brush or swab prior to making-up threaded connection 301. In one embodiment pipe dope 351 may have a kinematic viscosity greater than about 350 centistokes at 40 degrees C. Further, pipe dope 351 may have a kinematic viscosity of about 420 to 550 centistokes at 40 degrees C.

Figure 1A:
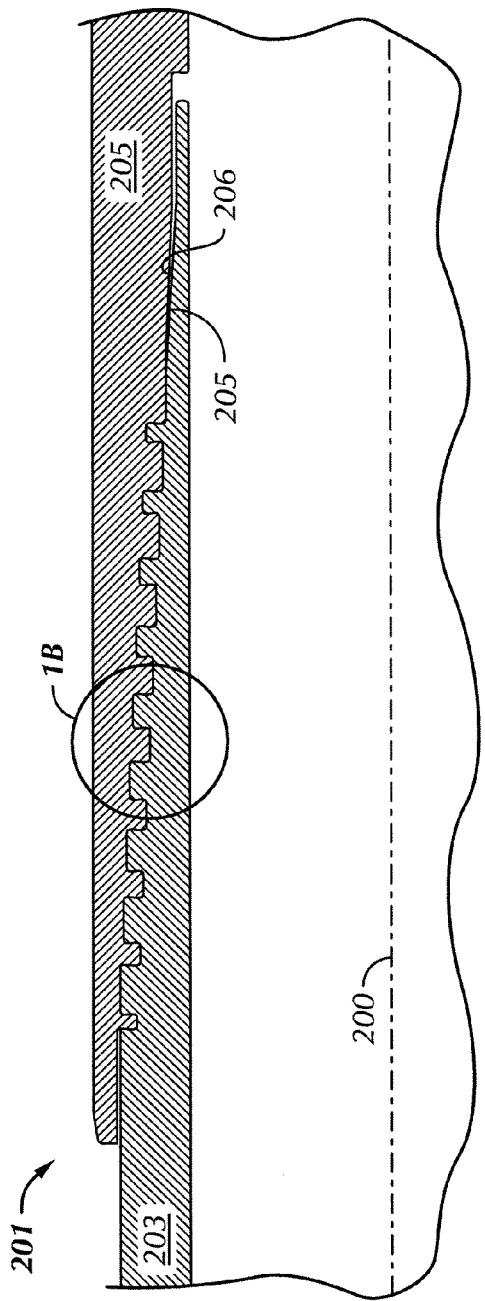
FIGS. 1A and 1B show cross-section views of a wedge thread tubular connection in accordance with the prior art.
Figure 1B:
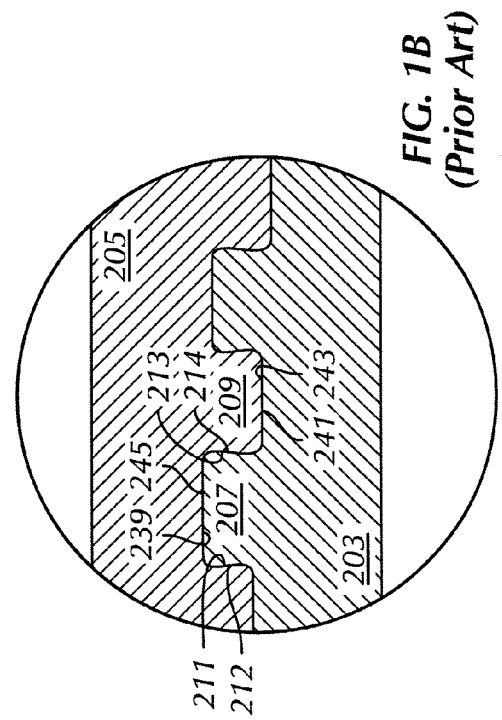
Figure 2:
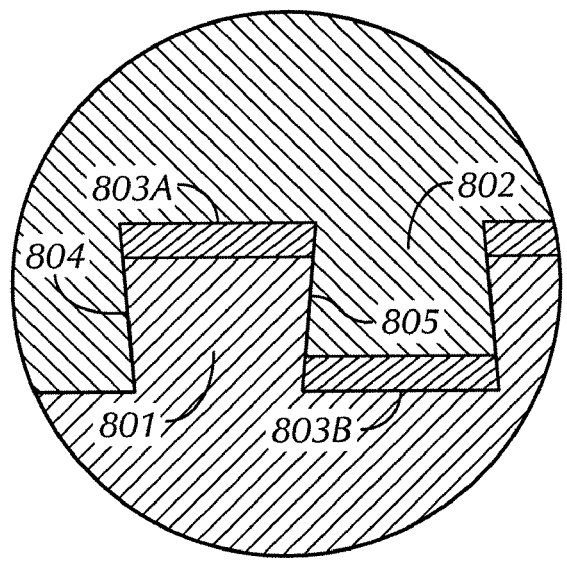
FIG. 2 shows a portion of wedge thread in accordance with an embodiment of the present disclosure.

Referring now to FIG. 2, one technique for using high kinematic viscosity pipe dope is to simply apply a generally even coating of the pipe dope onto either the pin thread or the box thread. The pin thread is generally the easiest for applying the pipe dope because of its external location. With such a technique, the pipe dope will be disposed on both the load and stab flanks of the pin thread. During make-up, corresponding load flanks 805 and stab flanks 804 of a pin thread 801 and a box thread 802 will contact each other and squeeze out the pipe dope therebetween, as shown. The displaced pipe dope will then migrate to fill selected root/crest clearance(s) 803A and 803B.

In one embodiment, the selected clearance may only be between the pin crest and the box root (selected root/crest clearance 803A), or only between the pin root and the box crest (selected root/crest clearance 803B). To select a root/crest clearance, volume balancing of the pipe dope may be used. Assuming an even deposition of the pipe dope, the total volume of the root/crest clearance 803A and 803B may be selected so that it may contain both the initially deposited pipe dope and that which is displaced from between the load flanks 805 and the stab flanks 804. Because the relative dimensions of roots and crests vary along the helix of the thread, the dimensions at the equivalence point of the connection may be used to provide a sufficient two-dimensional estimate for volume balancing of the pipe dope. The accuracy of the estimate based on the equivalence point will be adversely affected by any varying features of the connection, such as a variable wedge ratio or thread height, but the equivalence point should still provide sufficient accuracy for such an embodiment. Alternatively, for embodiments in which there is clearance between substantially all roots and crests, the sum of the widths of an adjacent root and crest may be used for volume balancing calculations.

To achieve volume balancing, the length of the load flanks and stab flanks relative to the root/crest width may be used. The "length" of the load flanks and the stab flanks refers to the distance from the root to the crest along the load flanks and the stab flanks. In contrast, flank "height" refers to the radial distance from crest to root. The "area" of pipe dope may be calculated based on the thickness of the pipe dope deposited on the thread. The thickness will depend on the particular formulation of the pipe dope and the brush or swab used to apply the pipe dope. Minimal experimentation may be required to determine the thickness of the pipe dope that results from a combination of pipe dope and application technique. Note that the amount of pipe dope deposited on the roots and crests should be taken into account for selecting the root/crest clearance. A volume balancing equation in accordance with one embodiment of the present disclosure is shown below.

$$A_C + A_D = x(L_A + L_B + L_C + L_D) \qquad (1)$$

Wherein, $A_C$ is the area of root/crest clearance 803A, $A_D$ is the area of the root/crest clearance 803B, x is the pipe dope thickness, $L_A$ is the length of stab flanks 804, $L_B$ is the length of the load flanks 805, $L_C$ is the pin crest width, and $L_D$ is the pin root width.

The above volume balancing equation assumes a constant pipe dope thickness "x" on the load flank, stab flank, root, and crest of the pin thread. The gap between the roots and crests may be calculated by dividing the root/crest clearance areas by their corresponding root and crest widths. Those having ordinary skill in the art will be able to adjust the volume balancing equation appropriately to account for different thicknesses on the portions of the threads. If only one selected root/crest clearance exists (either 803A or 803B), then that area would be about the area of x multiplied by the pin crest width, pin root width, pin load flank, and the pin stab flank. Although the above equation is demonstrated with respect to an embodiment with pipe dope disposed on only the pin thread, those having ordinary skill in the art will be able to use these teachings for the box thread as well.

To use a volume balancing equation, some empirical tests may be performed to determine an approximate pipe dope thickness. For example, application of pipe dope may be performed at one or more selected temperatures for various pipe dope formulations. Because pipe dope thickness can be affected by the application method, a standardized application method may be created to provide consistency in pipe dope thickness. For example, brushes of a specific bristle count and coarseness may be tested and specified for use with various pipe dope formulations and ambient temperatures. Another option is to apply a selected amount of pipe dope on the pin member or box member based on weight or volume. The selected amount of pipe dope may then be spread in a substantially even manner to provide an approximate pipe dope thickness. Those having ordinary skill in the art will appreciate that the manner in which the pipe dope is applied is not intended to limit the present disclosure.

Figure 4A:
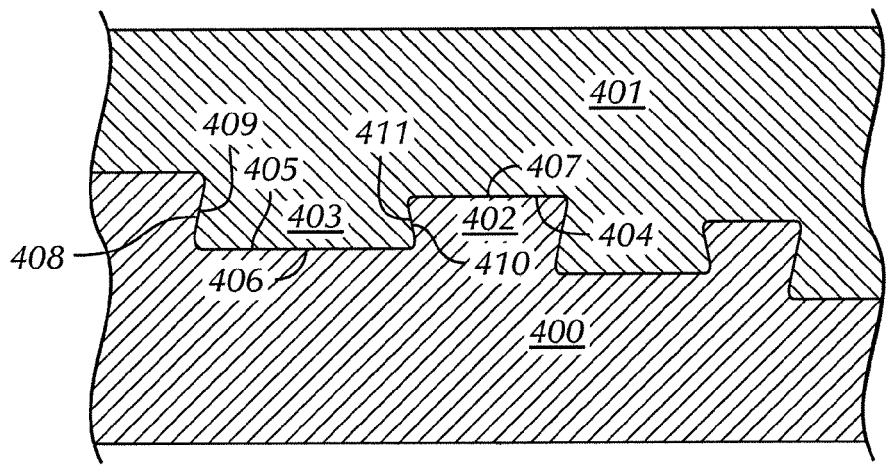
FIGS. 4A-F schematically depicting various thread clearance schemes that may be employed with embodiments of the present disclosure.

Referring now to FIG. 4A, a wedge thread disclosed in U.S. Pat. No. RE 34,467 issued to Reeves, and assigned to the assignee of the current application is shown. FIG. 4A shows pin member 400 which includes a pin thread 402, having a pin thread crest 404, a pin thread root 406, a pin thread stab flank 408 and a pin thread load flank 410. Similarly, a box member 401 includes a box thread 403 having a box thread crest 405, a box thread root 407, a box thread stab flank 409, and a box thread load flank 411. In FIG. 4A, pin member 400 and box member 401 are shown in a selected power-tight made-up condition; that is, pin member 400 has been fully made-up (or threaded) into box member 401 to a selected make-up torque or rotational position. Note that there is full contact between corresponding roots (406, 407) and crests (404, 405) of the pin and box members, and between corresponding stab (408, 409) and load flanks (410, 411) of the pin and members. That is, there are substantially no gaps between the pin and box threads 402 and 403.

Figure 4B:
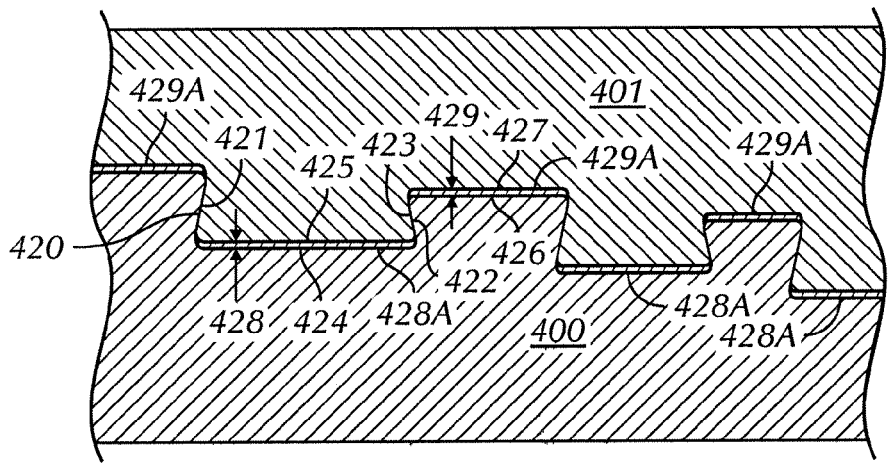

In contrast, FIG. 4B shows a wedge thread connection disclosed in U.S. Pat. No. RE 30,647 issued to Blose (the "Blose connection") and assigned to the assignee of the current application, again at a selected power-tight make-up. In this wedge thread connection, there is full contact between pin thread stab flank 420 and box thread stab flank 421, and between pin thread load flank 422 and box thread load flank 423. However, there is a pin root gap 428 between pin thread root 424 and box thread crest 425, and a box root gap 429 between pin thread crest 426 and bow thread root 427. In FIG. 4B, pin root gap 428 and box root gap 429 are the same, and are both consistent for the length of the engaged thread. As a general rule, pin root gap 428 is the same as box root gap 429 in a Blose connection, although those skilled in the art will recognize that the pin root gap 428 and box root gap 429 may be different. The root-crest gaps in the Blose connection create two wedge thread free volumes at make-up; pin root wedge thread free volume 428A and box root wedge thread free volume 429A.

Figure 4C:
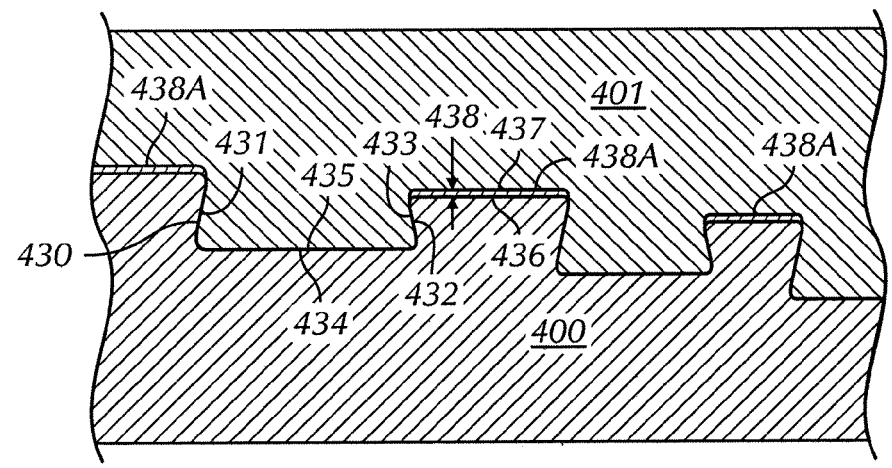

Referring now to FIG. 4C, a similar wedge thread configuration taught in U.S. Patent Application Publication No. US 2006/0261595 A1 from Verger, et al, again at a selected power-tight make-up is shown. In this configuration, there is a box root gap 438 between pin thread crest 436 and box thread root 437, but there is contact between pin thread root 434 and box thread crest 435, and between the corresponding box and pin flanks, that is, between pin thread stab flank 430 and box thread stab flank, as well as between pin thread load flank 432 and box thread load flank 433. In this connection, there is one wedge thread free volume at make-up, box root wedge thread free volume 438A.

Furthermore, while gap 438 is referred to as a root gap in the context of the box member 401, it should be understood that the same gap (438) may be referred to as a crest gap in the context of pin member 400. Thus, gap 438 may be interchangeably referred to as either a box root gap or a pin crest gap, depending on the frame of reference desired. Therefore, if clearance gap volumes are being measured or calculated from pin member 400, gap 438 may be referred to as a crest gap. Alternatively, gap 438 may be referred to as a root gap if gap volumes are being measured or calculated from box member 401.

Figure 4D:
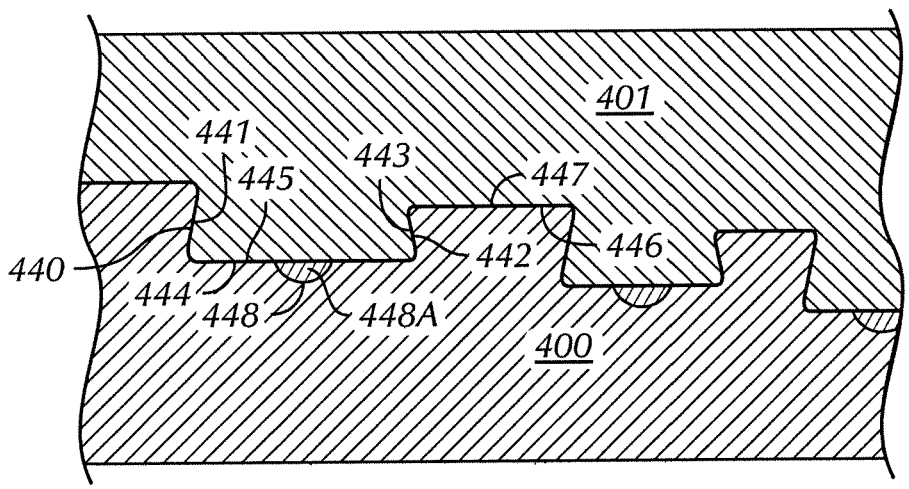

Referring now to FIG. 4D a wedge thread connection as taught in U.S. Patent 6,050,610, issued to Enderle et al, and assigned to the assignee of the current application is shown. This threaded connection is similar to the connection shown in FIG. 4A, in that there is full contact between box thread stab flank 441 and pin thread stab flank 440, between box thread load flank 443 and pin thread load flank 442, between box thread root 447 and pin thread crest 446, and between most of pin thread root 444 and box thread crest 445. However, as shown, a stress relief groove 448 having a stress relief groove volume 448A is cut into thread root 444 of pin member 400. Therefore, in the connection shown, the free volume of the wedge thread is equal to stress relief groove volume 448A, since substantially all other thread surfaces are in contact with one another.

Figure 4E:
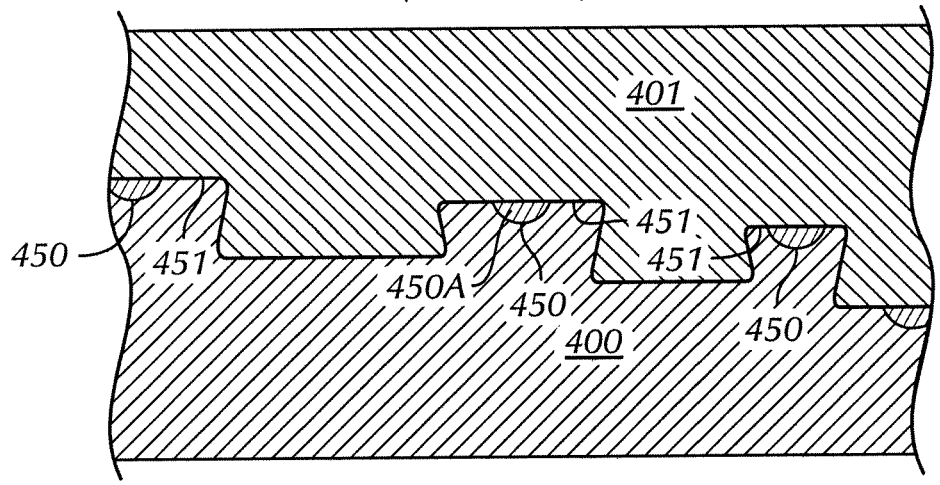

Referring briefly now to FIG. 4E, a wedge thread connection as taught in U.S. Pat. No. 6,905,149, issued to DeLange, et al. is shown. This threaded connection is similar to the threaded connection shown in FIG. 4D, except that the stress relief groove 450 is cut into the thread crest 451 of pin member 400. Stress relief groove 450A has stress relief groove volume 450A, which is equal to the wedge thread free volume.

Figure 4F:
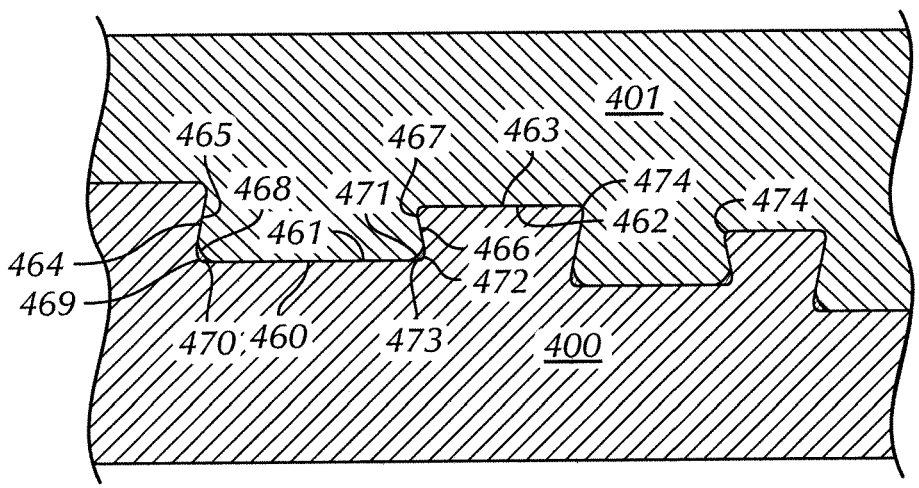

Referring now to FIG. 4F a wedge thread connection having a pin thread root 460, a pin thread stab flank 464, a pin thread load flank 466, a pin thread crest 462, a box thread root 463, a box thread stab flank 465, a box thread load flank 467, and a box thread crest 461 is shown. In this example, a radius 468 between box thread stab flank 465 and box thread crest 461 is larger than a radius 469 between pin thread stab flank 464 and pin thread root 460, thus creating a stab free volume 470. Similarly, a radius 471 between box thread load flank 467 and box thread crest 461 is larger than a radius 472 between pin thread load flank 466 and pin thread root 460, thus creating a load free volume 473. In this connection, the total wedge thread free volume is the sum of stab free volume 470 and load free volume 473. Those skilled in the art will recognize that additional free volume may be created by similar radius mismatch at the root radii 474 of the box thread.

Furthermore, it should be understood that different forms of wedge thread free volume may be combined to achieve a desired total free volume. For example, stress relief grooves (448 of FIG. 4D) located at the pin thread root may be combined with the stress relief groove (450 of FIG. 4E) located at the pin thread crest. In this case, the total wedge thread free volume would include stress relief groove volume 448A plus stress relief groove volume 450A.

In another embodiment, a Blose connection (i.e., as shown in FIG. 4B) may be combined with pin root stress relief grooves as shown in FIG. 4D and pin crest stress relief grooves 450 as shown in FIG. 4E as well as mismatched radii at both the pin thread roots and at the box thread roots, as discussed above with reference to FIG. 4F.

However, those having ordinary skill in the art will recognize that any method to create wedge thread free volumes may disadvantageously affect thread performance (for example, in the tensile, torsional, or compressive loads the connection can carry, or in the internal or external pressure that the connection can resist), and further, that combining several free volume methods in order to achieve a large total free volume may have especially deleterious effects on the properties of a wedge thread connection. For example, the root-crest gaps shown in FIGS. 4B and 4C may limit the ability of a wedge-threaded connection to achieve a thread seal. Further, the pin root stress relief groove shown in FIG. 4D may affect the tensile capacity of the pin connection if the groove is too close to a critical section of the pin member. Furthermore, the mismatched radii shown in FIG. 4F may reduce the amount of flank area in contact, thereby encouraging galling or reducing the tensile and/or compressive capabilities of the wedge-threaded connection.

Furthermore, it may desirable to determine a target total wedge thread free volume, regardless of the method or methods used to achieve it. Through experimentation, it has been determined that a target wedge thread free volume range may be determined for wedge thread connections on pipe having a diameter equal to, or in excess of 9 inches by multiplying the engaged thread area of the connection by 0.003 inches to 0.004 inches. In other sized wedge-threaded connections, a target free volume may range from 0.001-0.005 inches times the engaged thread area. However, it should be understood by one of ordinary skill in the art that a "target" total wedge thread free volume need not be optimal, but may instead be improved relative to a formerly constructed corresponding wedge-threaded connection.

For the purpose of this disclosure, the factor multiplied by the engaged thread area to achieve the calculated target free volume will be referred to as a "dope thickness factor." Thus, for wedge-threaded pipe connections exceeding a nine-inch nominal diameter, the dope thickness factor may be between about 0.003-0.004 inches. Further, it has been determined that while this wedge thread free volume may be evenly (i.e., at a consistent thickness) distributed over the entire length of the engaged thread, it may also be beneficial to distribute the wedge thread free volume according to a distribution profile over the length of the engaged thread such that there is a wedge thread free volume gradient. In one embodiment using such a distribution profile, there may be more free volume proximate the middle of the thread, and progressively less free volume towards each of the distal ends of the connection.

Figure 5:
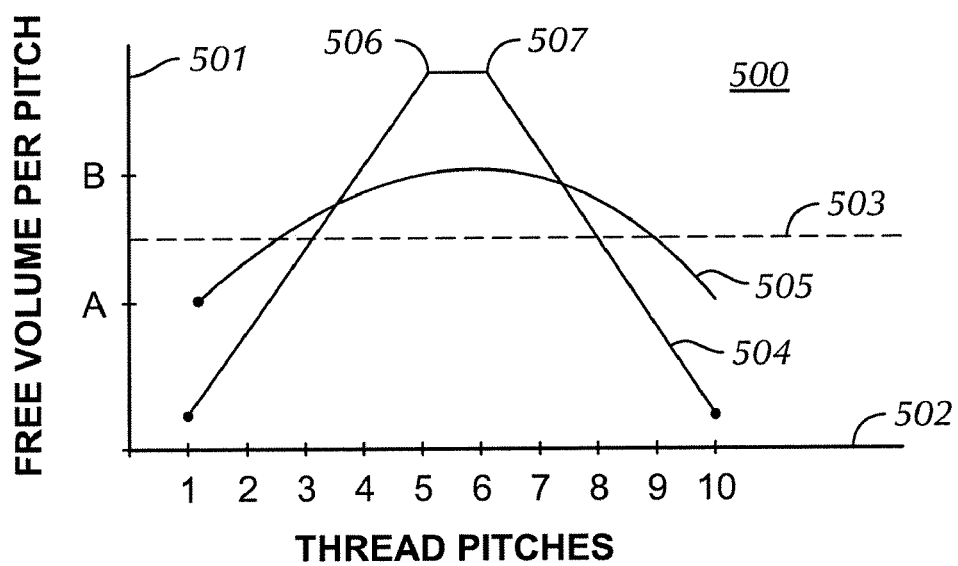
FIG. 5 comparatively depicts three free volume distribution profiles in accordance with embodiments of the present application.

Referring now to FIG. 5, various distribution profiles for wedge thread free volume are shown in relation to one another. Chart 500 includes a horizontal axis 502 identifying each thread pitch in a ten-pitch thread, and a vertical axis 501 showing the corresponding free volume within each pitch. Point A on vertical axis 501 represents a free volume of 0.003 inches times the engaged thread area per pitch, and Point B on vertical axis 501 represents a free volume of 0.004 inches times the engaged thread area per pitch. Curve 503 discloses a thread with a fixed wedge thread free volume per pitch, between points A and B (e.g., 0.0035 inches times the engaged thread area per pitch). Thus, a threaded connection represented by Curve 503 will, therefore, have substantially the same amount of free volume per pitch at a selected make-up for every pitch of threads.

In contrast, curve 504 discloses a thread in which the free volume per pitch may be substantially the same for pitches 5 and 6 (at points 506 and 507 respectively), but becomes progressively smaller towards the distal ends of the connection. Those skilled in the art will recognize that there are many ways in which this may be accomplished, for example, by reducing the depth or width of a stress relief groove. While curve 504 is disclosed as a substantially linear changes in free volume per pitch, it should be understood that various other functions may be used to vary the volume per pitch between peak (thread pitches 5 and 6) and minimum (thread pitches 1 and 10) values. As such, curve 505 discloses wedge thread free volumes per pitch which change continuously (from a maximum at approximately pitch 6 to minimums at pitches 1 and 10) across the connection, as for example, by continuously varying the depth of a stress relief groove.

Note that in all of these cases, represented by Curves 503, 504, and 505, the total volume of the wedge thread free area will be between 0.003 times the engaged thread area of the entire connection and 0.004 inches times the engaged thread area of the entire connection. Experimentation has found that the approaches represented by Curves 504 and 505 may be generally superior to the approach represented by Curve 503.

Furthermore, it should be noted that while curve 504 includes free volume per pitch values both below and in excess of the target values defined by lines A, and B, the average of those values across the entire threaded connection may be within the "band" defined thereby. Particularly, in an exemplary embodiment, successive pitches 1-10 of curve 504 may have the following values:

| Pitch | Free Volume per Pitch/Engaged Thread Area |
|---|---|
| 1 | 0.0015 |
| 2 | 0.0025 |
| 3 | 0.0035 |
| 4 | 0.0045 |
| 5 | 0.0055 |
| 6 | 0.0055 |
| 7 | 0.0045 |
| 8 | 0.0035 |
| 9 | 0.0025 |
| 10 | 0.0015 |

Wherein the average free volume per pitch would be 0.0035, well within the band defined by lines A (0.003 inches times engaged thread area) and B (0.004 inches times engaged thread area). Alternatively, curve 505, depicted entirely within lines A and B for all pitches 1-10 may also extend outside those bounds and still maintain an average free volume per pitch between A and B. Alternatively still, curve 504 may be "compressed" such that all individual free volume per pitch values exist between lines A and B, yet still retaining the plateau profile of FIG. 5.

Figure 6:
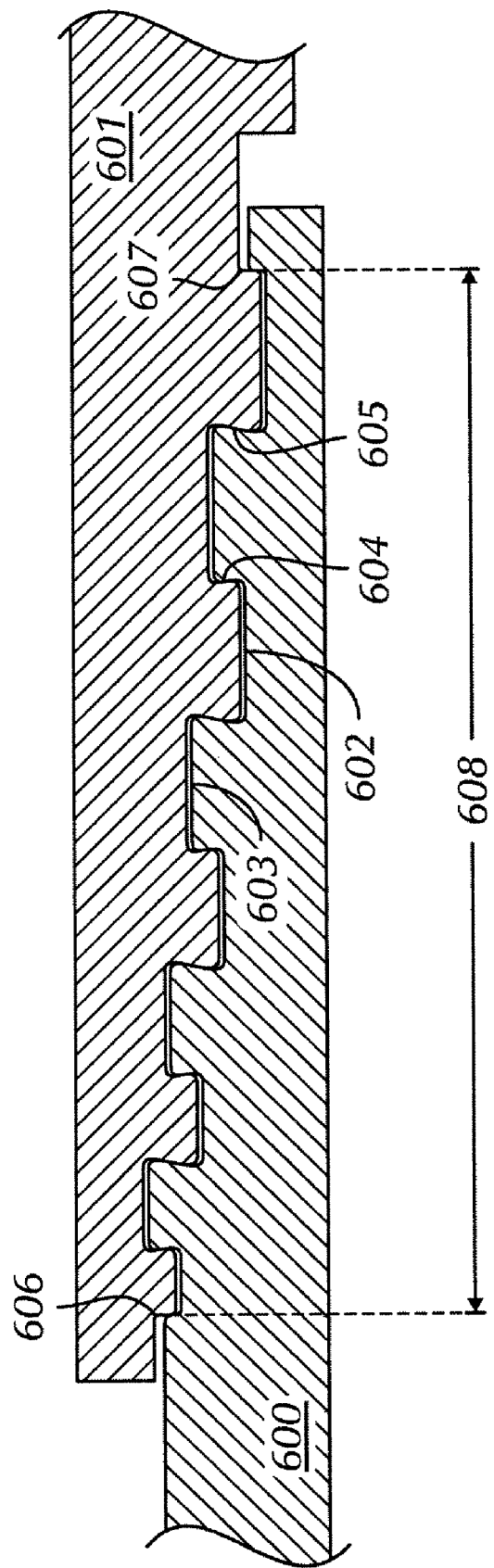
FIG. 6 schematically depicts an engaged thread area of a wedge thread connection in accordance with embodiments of the present disclosure.

For purposes of the current disclosure, the term "engaged thread area" is defined as the total surface area of the pin connection thread which is engaged with the corresponding box thread at a selected make-up. Referring now to FIG. 6, a pin connection 600 and a box connection 601 are shown at a selected power-tight make-up. In this example, the engaged thread area comprises the sum of the surface areas of pin thread root 602, pin thread crest 603, pin thread load flank 604, and pin thread stab flank 605. This sum is measured (or calculated) along the entire helical path of the thread extending between the pin nose thread engagement point 607 and the box face thread engagement point 606. That is, engaged thread area comprises the sum of all surface areas on the threaded portion of the pin over an axial thread engagement length 608. In this embodiment, the pin connection is selected for the calculation of engaged thread area rather than the box connection, because: (a) in a wedge thread, it is common to apply pipe dope only to the pin thread, not to the box thread, and (b) wedge thread pin threads typically have a single taper, thereby making it easier to accurately calculate an engaged thread area. One of ordinary skill in the art would understand that such a calculation for engaged thread area may be made using the female threads of box connection 601 without departing from the scope of the claimed subject matter.

Furthermore, it should be understood that when evaluating a proposed wedge-threaded connection, the engaged thread area, whether calculated or measured, should be determined before any clearance gap measures are employed. Because the target total free volume for pipe dope evacuation is calculated based upon the engaged thread area, the engaged thread area must be determined before clearance gaps, crest/root grooves, radial gaps, etc. are put into the design to ensure that the free volume calculation for those features is accurate.

Embodiments of the present disclosure may provide one or more of the following advantages. By providing a selected root/crest clearance for a wedge thread, more viscous and better sealing pipe dope may be used regardless of the temperature of the environment in which the connection will be made-up. High metal dope in particular can improve the sealing capability of the threaded connection. A root/crest clearance in accordance with embodiments of the present disclosure allows for high kinematic viscosity pipe dope, including those with high metal content, to be used for wedge thread connections independent of ambient temperature.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wedge-threaded tubular connection, comprising:
a pin member and a box member, wherein each of the pin and box members include an engaged thread area; and
a clearance gap volume formed between corresponding roots and crests of the pin and box members and arranged along an axial length of the engaged thread area according to a distribution profile;
wherein the clearance gap volume distribution profile is configured having a greater clearance gap volume proximate a central portion of the engaged thread area and progressively less clearance gap volume towards each of the distal ends of the engaged thread area.

2. The wedge-threaded tubular connection of claim 1, further comprising a nominal diameter greater than about 9 inches.

3. The wedge-threaded tubular connection of claim 1, wherein the clearance gap volume gradient comprises at least one of a root clearance gap, a crest clearance gap, a load flank clearance gap, a stab flank clearance gap, a crest/flank radius gap, a root/flank radius gap, a root groove, and a crest groove.

4. The wedge-threaded tubular connection of claim 1, wherein the distribution profile comprises at least one of a curved portion, a plateau portion, and a linear portion.

5. The wedge-threaded tubular connection of claim 1, wherein an average dope thickness factor per pitch of the distribution profile is between about 0.003 and 0.004 inches.

* * * * *